United States Patent
Schrodi

(10) Patent No.: US 7,251,242 B2
(45) Date of Patent: Jul. 31, 2007

(54) DISTRIBUTED TRANSMISSION OF TRAFFIC FLOWS IN COMMUNICATION NETWORKS

(75) Inventor: Karl Schrodi, Geretsried (DE)

(73) Assignee: Siemens Aktiengesellschaft, Munich (DE)

( * ) Notice: Subject to any disclaimer, the term of this patent is extended or adjusted under 35 U.S.C. 154(b) by 659 days.

(21) Appl. No.: 10/491,672

(22) PCT Filed: Oct. 4, 2002

(86) PCT No.: PCT/DE02/03750

§ 371 (c)(1),
(2), (4) Date: Apr. 1, 2004

(87) PCT Pub. No.: WO03/032676

PCT Pub. Date: Apr. 17, 2003

(65) Prior Publication Data

US 2004/0264450 A1     Dec. 30, 2004

(30) Foreign Application Priority Data

Oct. 4, 2001   (DE) ............................ 101 48 893
Dec. 14, 2001  (DE) ............................ 101 61 508
Dec. 14, 2001  (DE) ............................ 101 61 547

(51) Int. Cl.
    *H04L 12/28*      (2006.01)
(52) U.S. Cl. .................. 370/352; 370/235; 370/351; 370/395.31; 379/221.01; 379/221.15
(58) Field of Classification Search ........ 370/229–231, 370/235, 236, 237, 400, 350–356, 254, 256, 370/395.51, 395.21, 395.31; 709/220, 223, 709/226, 229; 379/112.05, 112.08, 220.01, 379/221.07
See application file for complete search history.

(56) References Cited

U.S. PATENT DOCUMENTS 5,491,690 A * 2/1996 Alfonsi et al. .............. 370/404

(Continued)

FOREIGN PATENT DOCUMENTS

| EP | 0 817 436 A2 | 1/1998 |
| EP | 0 926 921 A1 | 6/1999 |
| WO | WO 00/38375 | 6/2000 |

OTHER PUBLICATIONS

G.H. Petit, A. Buchheister, A. Guerrero, P. Parmentier, "Performance Evaluation Methods Applicable to an ATM Multi-Path Self-Routing Switching Network", Proceedings of the Thirteenth International Teletraffic Congress, Copenhagen, Denmark, Jun. 19-26, 1991, pp. 917-922.

*Primary Examiner*—Binh K. Tieu

(57) ABSTRACT

At least one queue is provided per current branch pattern in a network node. In this way, a queue can be jointly used for a plurality of distribution compartments which are imaged onto the same branch pattern in said node. Arriving packets are differentiated according to the particular distribution compartment to which they belong (i.e. not according to a particular flow to which they belong inside the distribution compartment). They are then inserted into a corresponding queue accordingly. Said queues are used by the ports belonging to each branch pattern. As soon as a port is free, it selects the next queue to use. The selection thus begins in sufficient time to ensure that no gaps appear on the outgoing line from said port. If a port uses a plurality (in this case fully or partially overlapping) of branch patterns, a search is then carried out for non-empty queues in all of that branch patterns, during the selection. If a plurality of non-empty queues are found in different branch patterns, the following queue to be used is selected according to a pre-determined criteria. The packet to be emitted from said queue is then defined according to a further criterion.

26 Claims, 6 Drawing Sheets

U.S. PATENT DOCUMENTS

| | | | |
|---|---|---|---|
| 5,495,479 A * | 2/1996 | Galaand et al. | 370/404 |
| 5,634,004 A * | 5/1997 | Gopinath et al. | 710/317 |
| 6,011,804 A * | 1/2000 | Bertin et al. | 370/468 |
| 6,069,895 A * | 5/2000 | Ayandeh | 370/399 |
| 6,122,743 A * | 9/2000 | Shaffer et al. | 726/3 |
| 6,147,992 A * | 11/2000 | Giroir et al. | 370/390 |
| 6,246,669 B1 * | 6/2001 | Chevalier et al. | 370/238 |
| 6,349,091 B1 * | 2/2002 | Li | 370/238 |
| 6,646,989 B1 * | 11/2003 | Khotimsky et al. | 370/238 |
| 6,819,673 B1 * | 11/2004 | Giroir et al. | 370/400 |
| 6,865,178 B1 * | 3/2005 | Euget et al. | 370/352 |
| 6,934,249 B1 * | 8/2005 | Bertin et al. | 370/218 |
| 2002/0167954 A1 * | 11/2002 | Highsmith et al. | 370/406 |
| 2004/0042402 A1 * | 3/2004 | Galand et al. | 370/237 |
| 2004/0095907 A1 * | 5/2004 | Agee et al. | 370/334 |
| 2005/0007955 A1 * | 1/2005 | Schrodi | 370/230 |
| 2005/0254448 A1 * | 11/2005 | Tang et al. | 370/328 |

* cited by examiner

DISTRIBUTED TRANSMISSION OF TRAFFIC FLOWS IN COMMUNICATION NETWORKS

CROSS REFERENCE TO RELATED APPLICATIONS

This application is the US National Stage of International Application No. PCT/DE02/03750, filed Oct. 4, 2002 and claims the benefit thereof. The International Application claims the benefits of following applications: German application No. 10148893.9 filed Oct. 4, 2001, German application No. 10161508.6 filed Dec. 14, 2001, German application No. 10161547.7 filed Dec. 14, 2001, all four applications are incorporated by reference herein in their entirety.

FIELD OF INVENTION

The field of the invention is distributed transmission of traffic streams in communication networks.

BACKGROUND OF INVENTION

In a communication network the traffic is intended to be distributed according to specific rules in a regular manner to all nodes and lines in the communication network, also referred to as the network.

With this type of distribution what is known as a 'distribution fan' results for every communication relation from a specific input A to a specific output B, said distribution fan comprising all the nodes and connecting routes that can expediently be used for this communication relation (see FIG. 1 and the relevant passages in DE 10161547.7). In a correspondingly meshed network the distribution fans of different communication relations of necessity overlap so that either identical or partially overlapping or even totally disjoint 'branch patterns' result at the individual nodes (see FIG. 2). The overlap is thereby a function of the distribution mechanisms operating in the network nodes.

The following mechanisms are known to date for the individual distribution of data packets to outgoing groups:
1) Simple distribution of the incoming traffic to an outgoing group without priorities:
(a) Prior distribution of the traffic into individual queues per port:
   A central traffic distributor distributes the incoming traffic to individual queues, each of which is assigned to precisely one outgoing port of the group. Distribution can be cyclical or (e.g. in the case of different port bandwidths) weighted according to different criteria. The current capacity of the individual queues (based on the number of packets or in the case of variable packet lengths based on the actual quantity of data in bytes) or the individual length of the data packet to be assigned in that instance can for example be taken into account. The ports generally manage the queues according to the FIFO principle. Anything in a queue must then also be processed by the assigned port.
(b) Use of a single queue with a multiserver principle:
   A favorable distribution of the traffic with optimum utilization of the available port capacities can be achieved with the multiserver principle. Here all incoming data is placed in a single queue, from which the ports, whenever they are free or become free, collect the next packet to be processed according to a FIFO (First In First Out) principle.
2) Distribution of the incoming traffic to an outgoing group with priorities:
(a) Prior distribution of the traffic into individual priority queues per port:
   A central traffic distributor distributes the incoming traffic to individual queues, whereby an individual queue is provided for each priority class for every outgoing port. The variants according to 1(a) can be used in the same way. When processing the queues, the ports take the priorities into account according to the corresponding rules ('strict', 'weighted', etc.).
(b) Multiserver principle with one queue per priority class:
   As 1(b), whereby the higher priority queues are processed in a preferred manner according to the priority rules.
3) Distribution of the incoming traffic to an outgoing group with priority-controlled Per Flow Queuing:
   A refinement of the elementary mechanisms disclosed above involves also setting up individual and separate queues per flow for granular differentiation and prioritization of different individual communication relations (flows). However this multiplies the complexity of queuing (due to the number of queues) and scheduling (due to selection of the next packet to be output from the plurality of queues) and makes it very much more a function of the traffic patterns (i.e. number of simultaneously active flows). It must also be ensured that there is fair distribution of resources between flows with equal priority, for which specific mechanisms such as Weighted Fair Queuing (WFQ) etc. can be used, the complexity of which (particularly when there is a very large number of queues) can significantly exceed that of a simple priority queuing system. Naturally Per Flow Queuing can be used in a port-specific manner [above pattern (a)] as well as in conjunction with the multiserver principle [above pattern (b)].
4) ECMP (Equal Cost Multiple Path):
   ECMP provides for distribution to a plurality of ports. Only those ports of a transmission node are taken into account here, the linked physical lines of which lead to the same adjacent transmission node. In this way (i.e. by load distribution to a plurality of physical lines) the transmission capacity between two adjacent transmission nodes can be increased, even if the transmission capacity of an existing single physical line cannot be increased further.

With all the known methods, during implementation in the queues only one indicator (address) is generally stored to identify the respective data packet in a generally shared data storage unit. The processing sequence results implicitly from the sequence of entries in the queue (e.g. according to the FIFO principle) or from the previous method for selecting the next queue to be processed (e.g. based on priority and where the priorities are the same e.g. cyclically, longest queue first, shortest queue first, as a function of weighting as with WFQ).

In order to achieve additional specific effects, further information can be included in this scheduling decision. There is very frequently a need for Traffic Shaping in ATM technology in particular (but also in isolated cases in the IP environment). This method is intended to ensure that in general specific bandwidths are complied with, usually achieved by corresponding distance criteria between the cells (packets) of a connection (i.e. communication relation). Additional time information is stored for this purpose specifying an earliest, latest and/or optimum processing time for a queue or a specific cell (packet) (known as the calendar).

The mechanisms can also be extended with the same effect for application to a plurality of groups, in so far as these groups either do not overlap at all (are disjoint) or overlap completely (are identical). A solution for a fair and efficient packet-based traffic distribution to partially overlapping groups taking into account priorities is however not known.

SUMMARY OF INVENTION

One object of the invention is now to demonstrate how the traffic can be distributed in the network nodes to the outgoing connecting lines in the most optimum manner possible according to predefined branch patterns taking into account any specified prioritization of individual traffic streams or individual data packets, whereby every network node is to make a decision autonomously and individually for each data packet.

This object is achieved by the invention. The invention provides for at least one queue per current branch pattern in a network node according to the invention. One queue can thereby be used jointly for a plurality of distribution fans that are mapped onto the same branch pattern in this node.

Incoming packets are differentiated as a function of their association with a specific distribution fan (i.e. not as a function of association with a specific flow within the distribution fan). They are entered accordingly in an associated queue.

One aspect of the invention associated with particularly desirable advantages results from an exemplary embodiment with which the queues are processed by the ports belonging to the respective branch pattern. As soon as a port becomes free, it selects the queue it is to process next. Selection starts so promptly that there is no gap on the outgoing line. If a port processes a plurality of (in this case wholly or partially overlapping) branch patterns, non-empty queues are first sought via all these branch patterns during said selection process. If in this process a plurality of non-empty queues is found from different branch patterns, it is decided on the basis of a predefined criterion which queue is processed next. The packet to be output from this queue is then determined according to a further criterion.

The number of queues required is hereby advantageously limited and is only a function of the topology of the network, i.e. the number of adjacent nodes taking into account port grouping and not the traffic.

Use in combined networks poses no problem, as the invention is only used locally in a given network node.

Further advantageous configurations of the invention will emerge from the exemplary embodiments of the invention below:

For delay optimization a plurality of queues flagged with different priorities is provided within one branch pattern. The queues within one branch pattern are processed strictly on the basis of their priority. If a port processes a plurality of (in this case wholly or partially overlapping) branch patterns, the highest priority non-empty queue is first sought via all these branch patterns and this is processed. If a plurality of non-empty queues with the same priority is found from different branch patterns in the process, arbitration between these queues takes place based on a freely selectable criterion, e.g. the random principle, a cyclical sequence, the size of the group, the queue length (longest/shortest first), the time elapsed since this queue was last processed, the number of ports competent to process it.

Using prioritized queues means that a sufficiently good delay and distribution quality is achieved with comparatively little outlay.

To optimize the minimum possible delay for each packet, a plurality of queues flagged with different priorities is also provided within a branch pattern and is processed within a branch pattern according to strict priority. If a port processes a plurality of (in this case wholly or partially overlapping) branch patterns, the highest priority, nonempty queue is first sought via all these branch patterns and this is processed. If in the process a plurality of nonempty queues with the same priority is found from different branch patterns, a decision is made between these based on a time criterion. For this in addition to a storage indicator (address, see above), a further, preferably relative, time information element (time stamp) is also input in the queues, from which it can be read when the packet was entered in the queue or how long it has been there (FIG. 4). The queue is then selected that is headed by the longest waiting packet, with the result that a FIFO principle is implemented as the criterion.

This configuration advantageously ensures that the currently most urgent request is always processed with the minimum possible delay as each port becomes available, even with only partially overlapping groups, via all the branch patterns processed by this port. This is in particular very advantageous when data of interactive real-time services, e.g. telephone or video conference services, is transmitted as high priority traffic streams.

The packet-specific time criterion is not used with all queues but only in the case of high priority traffic (e.g. time-critical realtime applications) to handle this with the shortest possible delay and correspondingly fair distribution. Queues that process traffic without specific delay requirements or simply only best effort traffic can be assigned lower priority and be processed without taking such a time information element into account. In principle it is adequate only to store and evaluate the time information element for correspondingly high priority queues.

The granularity of the time information element should take into account the minimum transmission time of a packet, i.e. of the shortest possible packet on the fastest line of the group. The possible value range should be selected so that an overrun does not occur within the anticipated maximum delay time of a correspondingly high priority packet (consideration of the maximum lengths of the associated queues, port bandwidths, etc.) and a reliable decision is possible at any time. Any limit set for the high priority traffic in the network can then also be taken into account with the advantage of shorter queues.

Implementation can take place via a simple, regularly clocked round counter (restart in the event of overrun). The counter is only relevant locally, synchronization between nodes is not necessary, clock accuracy is not subject to any specific requirements, a combination of nodes with and without this mechanism is always possible in the same network. (The mechanism only relates to the individual local mode of operation within a node).

The time criterion is also used to sort out and reject packets that have waited too long for whatever reason and whose further transmission (in the context of the associated real-time application) no longer appears expedient. This can take place either during scheduling or by means of a separate, parallel process. Such a process could for example set the time information element at a defined initial value when the packet is entered in the queue, count it upward or downward with regular clocking and trigger corresponding actions, e.g. removal of the packet from the queue, when a specific limit or threshold value has been reached. Alternatively the difference between the entry time (as a fixed value) and the current time (that is counted) could be used as a decision criterion in a regularly repeated comparison.

The queues are processed by the ports according to the multiserver principle. The multiserver principle guarantees fair assignment and optimum use of available resources even and specifically with variable packet lengths. The scheduling process is initialized by the outgoing port precisely when said port becomes free. However this takes place (with knowledge of the (residual) length of the packet currently being processed) so promptly that the decision and next packet to be output are ready for output at the end of the previous one. A further major advantage of the multiserver principle is also that in the case of ports of different bandwidths, these differences are taken into account automatically during distribution, in that ports, as they become free, almost autonomously collect new data from the queue(s).

The selection of the next queue to be processed by a port is made using a scheduling function.

Further separate queues are used to take into account additional criteria that may differ in some cases for each distribution fan.

The further criterion is a FIFO (First In First Out).

The queues are only created as necessary. Queues not used for quite a long time are released again (time out). This reduces the number of queues actually required, as the number of current branch patterns may generally be smaller than the number of current communication relations.

The traffic streams are deliberately distributed irregularly based on corresponding parameters. Further criteria are included in the distribution decision for this purpose.

An adaptive approximation to a required target value for distribution is provided. With partially overlapping groups it is possible that the required, regular or predefined distribution might not be achieved in an optimum manner, because interference between groups has a disruptive effect.

According to a simple alternative, this can be calculated beforehand and taken into account when defining the scheduling rules.

In complex cases (e.g. in constantly changing real network conditions), in which the network response and therefore the response of the components of the invention cannot be calculated reliably in advance, it is advantageous to be able to adjust the scheduling parameters adaptively during operation.

This can take place either autonomously in the network node or by external initialization (definition of new rules).

The comparison of (or difference between) the distribution actually achieved and the required distribution can serve as the regulating criterion for this purpose. For example the frequency of processing of the different queues by the different ports (or the resulting load on the ports per traffic class) should preferably be measured and made available to the correction unit.

For network-wide corrections data about the mean and maximum occurring lengths of the different queues may also be of significance.

These measurements and methods are preferably undertaken based on the number of packets. It should thereby be assumed that the effects of variable length packets average out over relatively short periods. Alternatively such considerations and measurements can also be applied taking into account the individual lengths of all individual packets.

To achieve a specific load distribution within a group, a time information element is held per queue for every port and taken into account during scheduling.

The time information element contains for example the times when the queue was last processed by the different ports.

Advantageously a specific minimum and/or maximum interval between two processing operations can hereby be set for each port or the times could be evaluated in relation to each other ('port x does not become active again until it has been out of action for twice as long as port y'). Such a time information element could also be used to determine a next target processing time (earliest, latest, optimum) or could also be stored as such (calendar).

An alternative and comparatively simpler solution is only to count for each queue how often it was processed by which port and to derive from this the decision whether it should currently be taken into consideration. The counters can be reset or decremented at intervals or on a sliding basis (leaky bucket).

Even with these variants the parameters and rules could be adjusted adaptively using measurement results as disclosed above.

BRIEF DESCRIPTION OF THE DRAWINGS

The invention is described in more detail with reference to the exemplary embodiments shown in the Figures, in which.

DETAILED DESCRIPTION OF INVENTION

Figure 1:
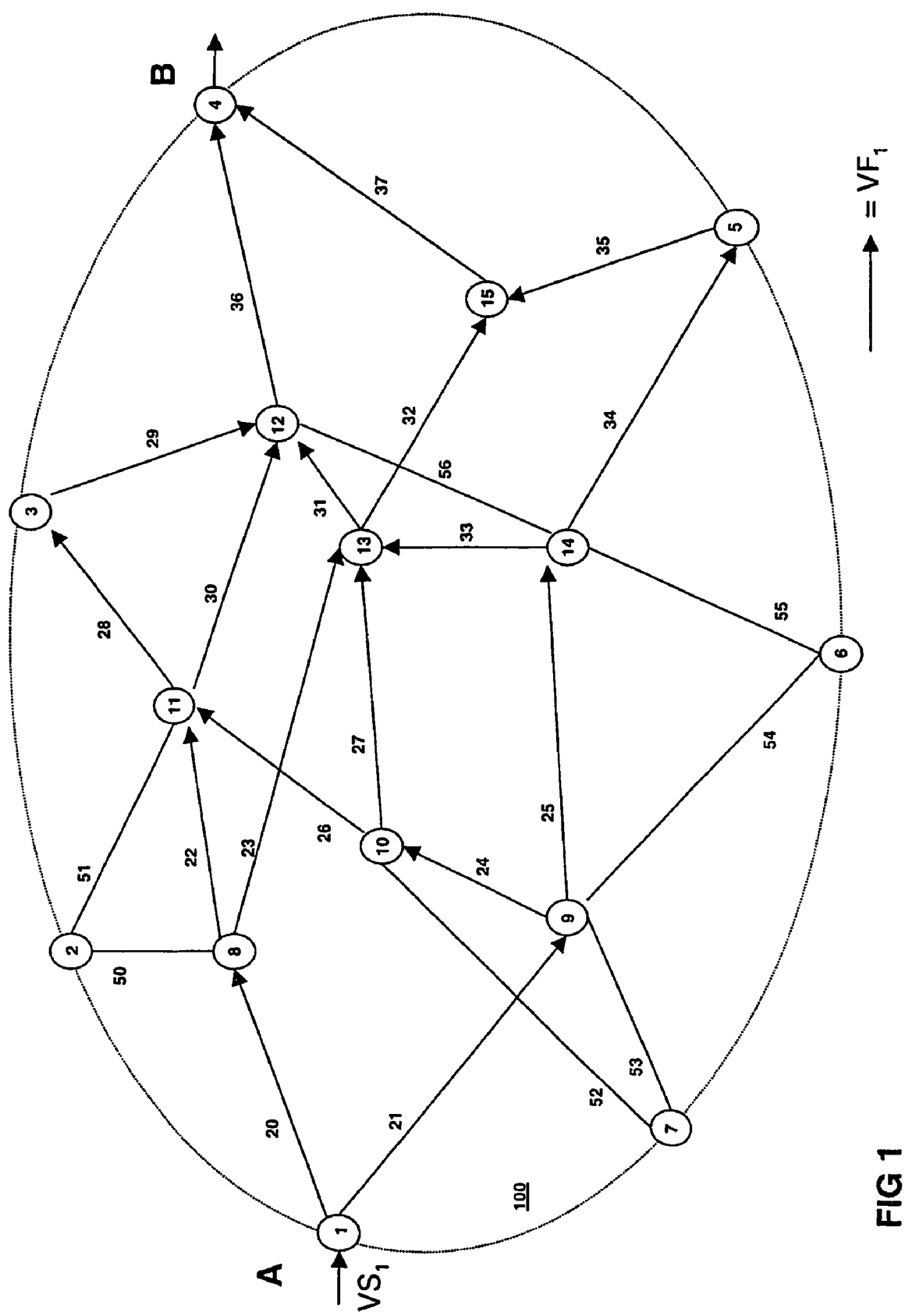
FIG. 1 shows a first distribution fan, which comprises all the network nodes and edges that can expediently be used for a communication relation from a transmitting node A to a receiving node B in a network.

FIG. 1 shows an example of a distribution fan $VF_1$ in the communication network 100. The network 100 comprises a plurality of network nodes 1-15, whereby the network nodes 1-7 are configured as input and/or output nodes. At least one traffic stream $VS_1$ is transmitted from the network node 1 configured in the present instance as transmitting node A to the network node 4 configured in the present instance as receiving node B with the following distribution:

| From node | Via edge | To node |
| --- | --- | --- |
| 1 (A) | 20 | 8 |
|  | 21 | 9 |
| 8 | 22 | 11 |
|  | 23 | 13 |
| 9 | 24 | 10 |
|  | 25 | 14 |
| 10 | 26 | 11 |
|  | 27 | 13 |
| 11 | 28 | 3 |
|  | 30 | 12 |
| 13 | 31 | 12 |
|  | 32 | 15 |
| 14 | 33 | 13 |
|  | 34 | 5 |
| 3 | 29 | 12 |
| 5 | 35 | 15 |
| 12 | 36 | 4(B) |
| 15 | 37 | 4(B) |

It can clearly be identified that the traffic sent to the receiving node B from every network node between the nodes A and B, from which more than one residual route extends to the receiving node B, is transmitted distributed to at least two residual routes. For the network nodes 1, 8, 9, 10, 11, 13 and 14 the central column corresponds to the respective account-internal branch patterns, onto which the distribution fan $VF_1$ is mapped. For the network nodes 3, 5, 12 and 15 in the absence of different network edges there are no real branch patterns, onto which the distribution fan $VF_1$ could be mapped.

Figure 1A:
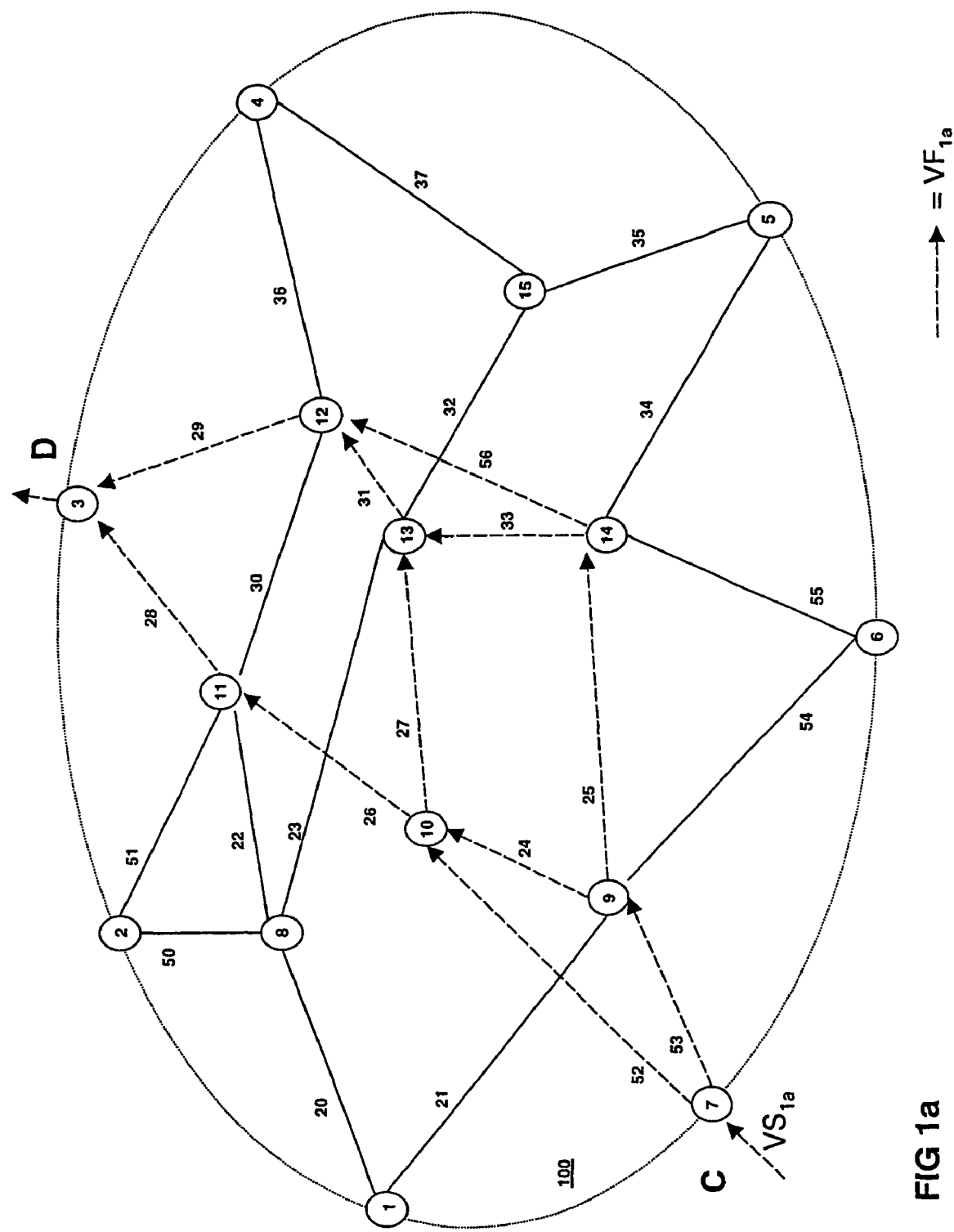
FIG. 1a shows a second distribution fan, which comprises all the network nodes and edges that can expediently be used for a communication relation from a transmitting node C to a receiving node D in the network according to FIG. 1.

FIG. 1a shows a second example of a distribution fan $VF_{1a}$ in the communication network 100. At least one traffic stream $VS_{1a}$ is transmitted from the network node 7 configured in the present instance as the transmitting node C to the network node 3 configured in the present instance as the receiving node D with the following distribution:

| From node | Via edge | To node |
| --- | --- | --- |
| 7 (C) | 52 | 10 |
|  | 53 | 9 |
| 9 | 24 | 10 |
|  | 25 | 14 |
| 10 | 26 | 11 |
|  | 27 | 13 |

-continued

| From node | Via edge | To node |
| --- | --- | --- |
| 14 | 33 | 13 |
|  | 56 | 12 |
| 13 | 31 | 12 |
| 12 | 29 | 3 (D) |
| 11 | 28 | 3 (D) |

Again it can be clearly identified that the traffic sent to the receiving node D is transmitted distributed to at least two residual routes from every network node between the nodes C and D from which more than one residual route extends to the receiving node D. For the network nodes 7, 9, 10 and 14 the central column corresponds to the respective account-internal branch patterns, onto which the distribution fan $VF_{1a}$ is mapped. For the network nodes 11, 12 and 13 in the absence of different network edges there are no real branch patterns, onto which the distribution fan $VF_{1a}$ could be mapped.

Figure 2:
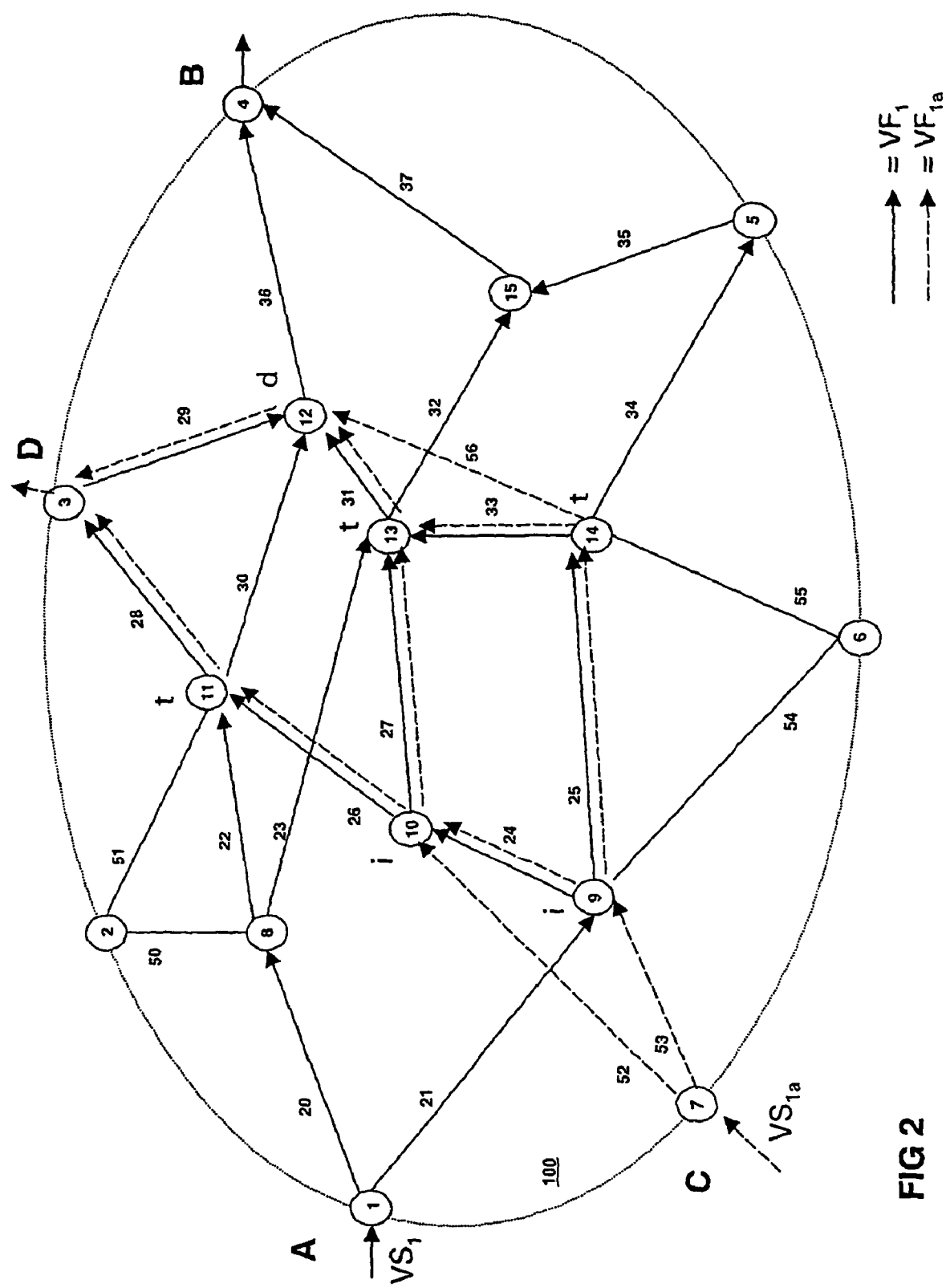
FIG. 2 shows the two partially overlapping distribution fans shown together in the network according to FIG. 1.
Figure 3:
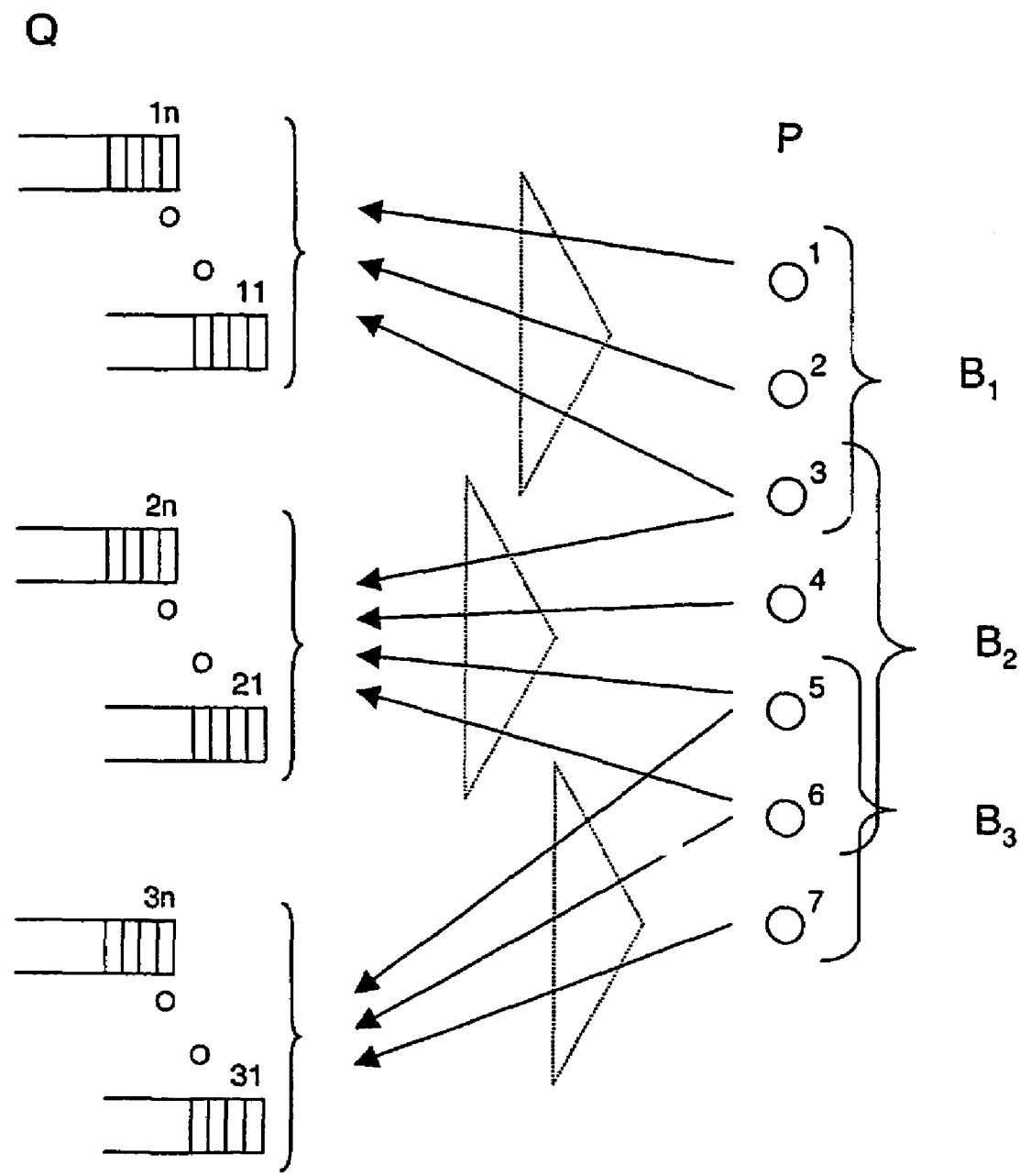
FIG. 3 shows the basic form of a solution according to the invention (still without a time stamp) with n=1 for the most elementary configuration of the invention, whereby the arrow direction indicates that the port collects the next packet to be output and whereby dotted triangles represent the scheduling function thereby activated (from the port)
Figure 4:
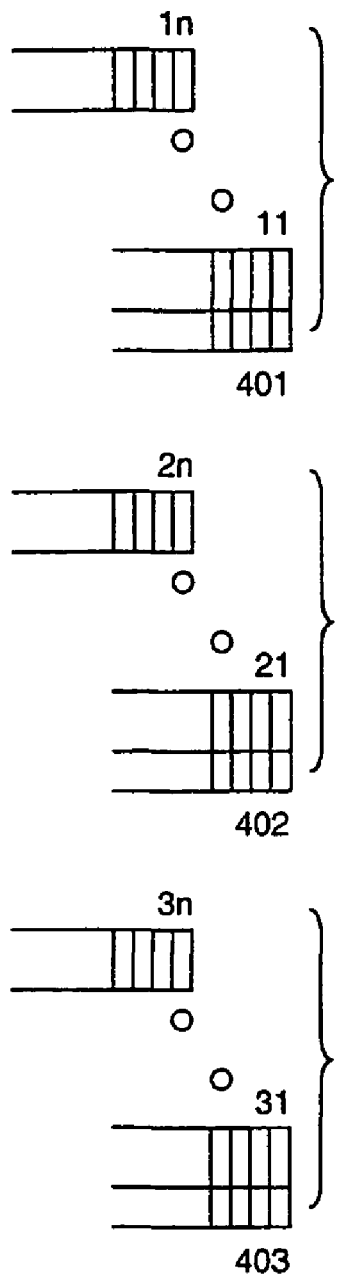
FIG. 4 shows a solution according to the invention with time stamp information for the packets in the highest priority queue (the time stamp principle can of course also be used for lower priority queues down to best effort), which is also evaluated by the scheduler, whereby the arrow direction indicates that the port collects the next packet to be output and whereby the dotted triangles represent the scheduling function thereby activated (from the port)
Figure 4:
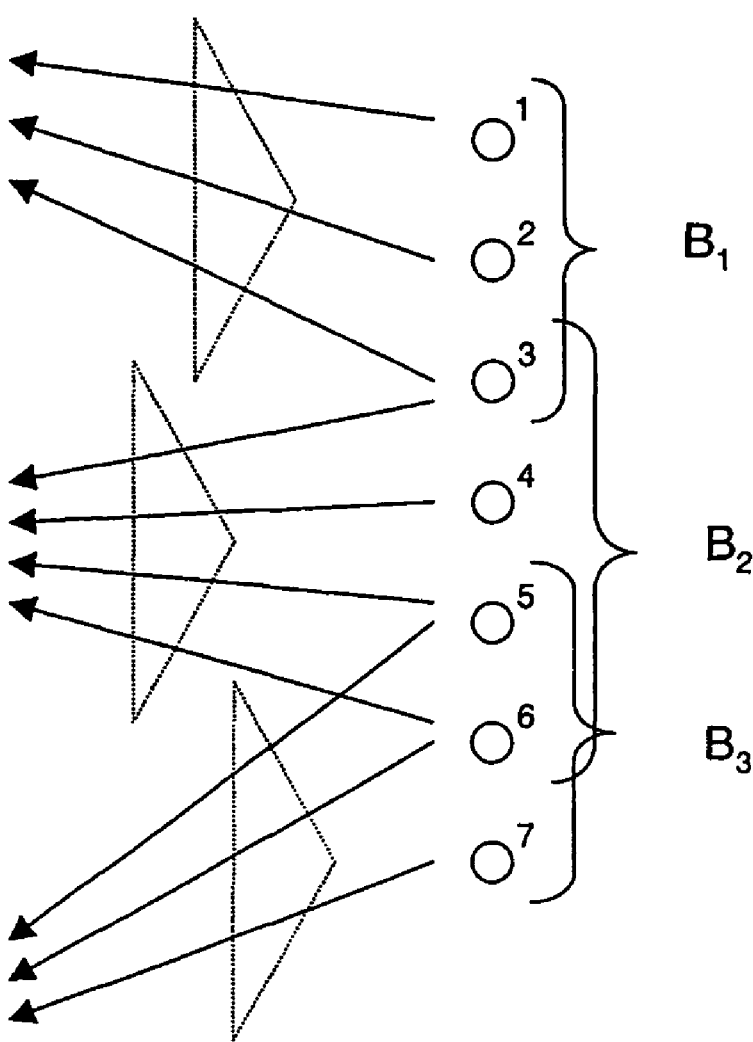
Figure 5:
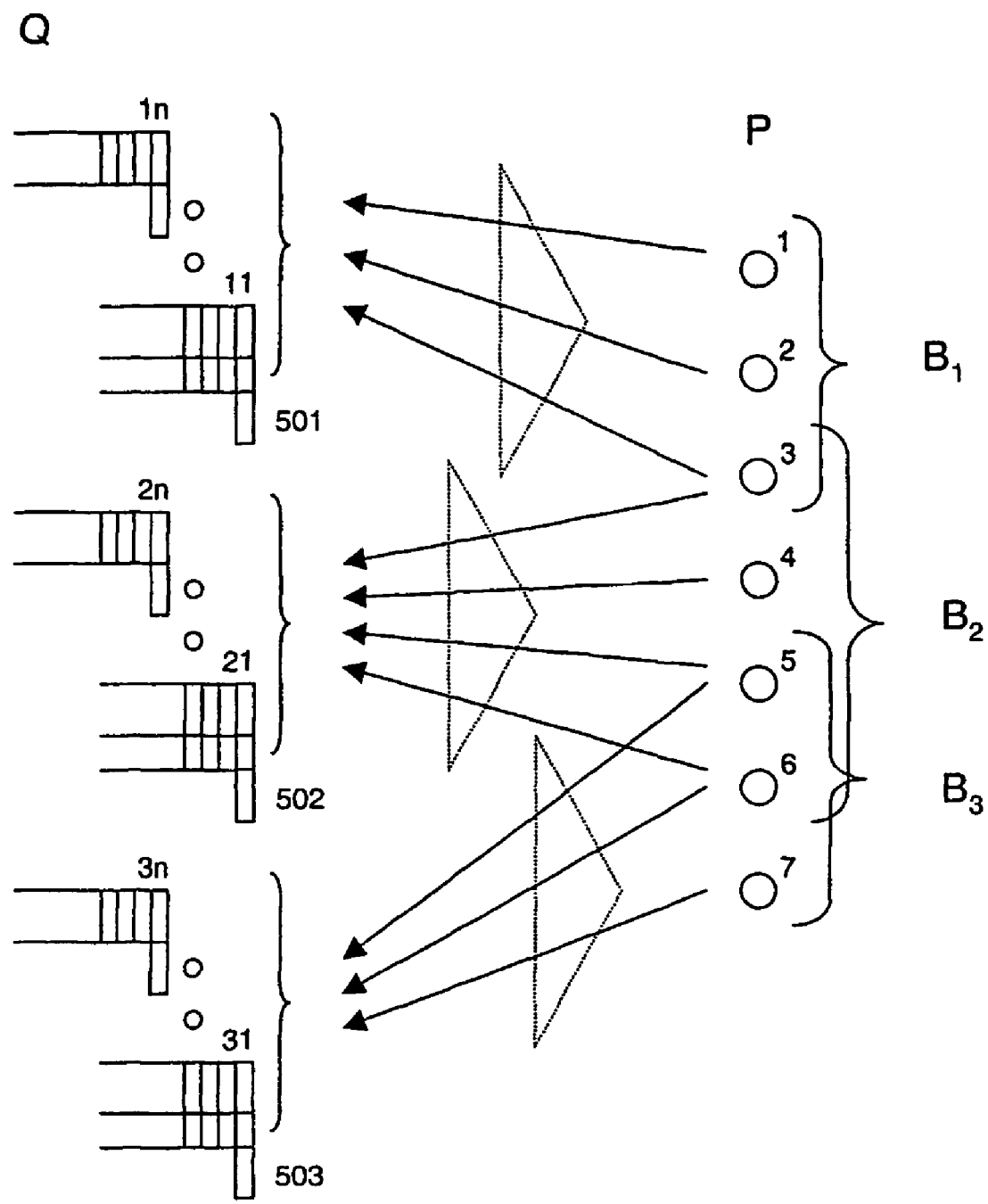
FIG. 5 shows a solution according to the invention with further auxiliary registers per queue (with auxiliary information for activating a predefined traffic distribution for the respective branch group in the group processing it), whereby the arrow direction indicates that the port collects the next packet to be output and whereby the dotted triangles represent the scheduling function thereby activated (from the port).

It should however be noted here that the branch patterns in FIGS. 1, 1a and 2 only show the structure of the meshing between the nodes. This does not exclude the possibility that there could be a plurality of parallel physical lines (even with different bandwidths) at one edge of the graph (i.e. between two adjacent nodes), which could be/are considered as separate ports during distribution as in FIGS. 3 to 5. Of course (unreal) branch patterns may very well exist for distribution to a plurality of ports of an edge. The distribution fans VF can in principle also be mapped onto these, even if the required distribution of the traffic to the different network nodes 1-15 is not effected as a result.

Finally the two distribution fans $VF_1$, $VF_{1a}$ are shown together in the communication network in FIG. 2. It can therefore clearly be identified how the two distribution fans $VF_1$, $VF_{1a}$ are mapped in the network nodes 9 and 10 onto identical branch patterns i, in the network nodes 11, 13 and 14 onto partially identical branch patterns t and in the network node 12 onto disjoint branch patterns d, as shown in the table below, in which different edges are indicated in bold type:

| Branch pattern (in node) for . . . | Distribution fan $VF_1$ | Distribution fan $VF_{1a}$ |
| --- | --- | --- |
| i (9) | 24 | 24 |
|  | 25 | 25 |
| i (10) | 26 | 26 |
|  | 27 | 27 |
| t (11) | 28 | 28 |
|  | 30 | — |
| t (13) | 31 | 31 |
|  | 32 | — |
| t (14) | 33 | 33 |
|  | 34 | — |
|  |  | 56 |
| d (12) | 36 | — |
|  | — | 29 |

These relations are shown again in the table below with particular emphasis on the different edges:

| Branch pattern (node) | Shared edges $VF_1, VF_{1a}$ | Different edges $VF_1$ | $VF_{1a}$ |
|---|---|---|---|
| i (9) | 24, 25 | — | |
| i (10) | 26, 27 | — | |
| t (11) | 28 | 30 | |
| t (13) | 31 | 32 | |
| t (14) | 33 | 34 | 56 |
| d (12) | — | 36 | 29 |

One particularly desirable advantage of the invention is that when overlapping branch patterns t are used, very flexible adaptation of the network nodes 1-15 and therefore the network 100 as a whole is achieved and can be optimized for almost any network application by means of any combination of the mechanisms a) time criterion per packet for delay optimization in the event of arbitration, b) adjustment of a predefined, where necessary also 'skewed' traffic distribution, c) adaptive subsequent adjustment to the required distribution pattern.

One example of intentionally irregular distribution of the traffic streams VS according to corresponding parameters by including further criteria in the distribution decision involves sporadically not taking into account a specific queue Q when scheduling for specific ports P according to corresponding rules. If for example in the case of distribution to four ports P the high or highest priority traffic of a branch group is to be distributed in a ratio 4:4:3:1 to the four ports P, the scheduler will not take into account the highest priority queue of this branch group in every $4^{th}$ scheduling process for the $3^{rd}$ port P and for the $4^{th}$ port it will include it in every $4^{th}$ scheduling process. As a result the total volume of the highest priority traffic should in any case remain (significantly) below the total capacity (port 1+port 2+¾ port 3+¼ port 4) of the group B provided for this.

Of course port bandwidth asymmetries can also be compensated for in this process. If for example the $4^{th}$ port P only has half the bandwidth of the other three ports P but it still has to be allocated one twelfth of the total traffic, the corresponding queue length is taken into account every second time for it.

It should be pointed out that the description of the components of the communication network of relevance to the invention should in principle not be seen as restrictive. It is clear in particular to a person skilled in the relevant art that the terms used should be understood functionally and not physically. As a result the components can also be provided partially or wholly in the form of software and/or using a plurality of physical devices.

The invention claimed is:

1. A network node of a packet-oriented communication network, the communication network having a plurality of nodes interconnected according to the topology of the network in such a way that a plurality of paths exist between the network nodes, comprising:
   at least one distribution fan containing the network node derived from the network topology for a specific communication relation between a first network node configured as a transmitting node and a second network node configured as a receiving node and comprising all the network nodes and routes that can be used for distributed transmission of traffic streams assigned to the communication relation in the communication network; and
   a branch pattern defined for the network node, onto which the distribution fan is mapped and a group of outgoing ports of the network node is determined, to which the traffic streams assigned to the distribution fan are distributed, the routes assigned to the ports leading to at least two different adjacent network nodes, wherein
   at least when at least one traffic stream is currently transmitted in a distributed manner by the network node according to the branch pattern, the network node comprises at least one queuing system for the branch pattern that comprises at least one queue.

2. A network node according to claim 1, comprising a separate queuing system each branch pattern, the groups of which differ from the groups of the other branch patterns in at least one port.

3. A network node according to claim 1, in which in the event that a plurality of different distribution fans are mapped onto the same branch pattern, either a separate queuing system is provided for each different distribution fan or a single queuing system is provided for all the distribution fans.

4. A network node according to claim 1, wherein at least one queuing system comprises at least two queues, whereby at least one of the two queues is flagged with a priority.

5. A network node according to claim 1, comprising a time information element at least for the packets waiting in a high-priority-queue, from which it can be read when the packets were entered in the queue or how long they have been there.

6. A network node according to claim 5, comprising a value range for the time information element that is selected taking into account the transmission time of the shortest possible packet on the fastest port so that an overrun does not occur within a given maximum delay time for a priority packet.

7. A network node according to claim 5, comprising a separate, parallel process for sorting and/or rejecting packets, the further transmission of which no longer appears expedient taking into account the time information element.

8. A network node according to claim 1, comprising a second time information element for at least one of the queues, by means of which the last processing time of the respective queue is indicated for every port of the group assigned to the queue.

9. A method for transmitting traffic streams in a packet-oriented communication network, comprising:
   providing a network node, wherein the network node is contained in at least one distribution fan that is derived from the network topology for a specific communication relation between a first network node configured as a transmitting node and a second network node configured as a receiving node and comprising all the network nodes and routes that can expediently be used for distributed transmission of traffic streams assigned to the communication relation in the communication network, and wherein a branch pattern defined for the network node, onto which the distribution fan is mapped and a group of outgoing ports of the network node is determined, to which the traffic streams assigned to the distribution fan are to be distributed, whereby the routes assigned to the ports leading to at least two different adjacent network nodes, and wherein at least when at least one traffic stream is currently transmitted in a distributed manner by the network node according to the branch pattern, the network node comprises at least one queuing system for the branch pattern that comprises at least one queue;

entering incoming packets in a queue assigned to the respective distribution fan; and transmitting the packets via a port of a group that is determined by mapping the respective relevant distribution fan onto a network-node-specific branch pattern, whereby the routes assigned to the ports of a group each lead to at least two different adjacent network nodes.

10. A method according to claim 9, wherein the traffic streams of a branch group are transmitted in a deliberately irregularly distributed manner via the ports of the assigned group.

11. A method according to claim 9, wherein a scheduling process is initiated by one of the outgoing ports to decide about the outputting of a next packet from one of the queues, said decision taking into account scheduling rules.

12. A method according to claim 11, wherein the scheduling process is initiated so promptly by the port before its release that the decision about the next packet to be output and the next packet itself are available so promptly that the next packet can be transmitted from the port immediately after the previous packet.

13. A method according to claim 11, wherein in the event of a plurality of filled queues that is assigned to the port, the scheduling rules contain a first predefined criterion, according to which it is decided which queue is processed next.

14. A method according to claim 13, wherein in the event of at least partial flagging of the queues with priorities, when the decision is made, the filled queues with low priority are not taken into account as long as at least one filled queue with a higher priority compared with these queues has to be taken into account.

15. A method according to claim 13, wherein the first criterion is configured as one of the following criteria:
random principle,
cyclical sequence,
size of group,
shortest queue first,
longest queue first,
as a function of queue weighting,
time elapsed since last time said queue was processed, or
number of ports competent to process them.

16. A method according to claim 11, wherein in the event of a queue with more than one packet, the scheduling rules comprise a second criterion, according to which the next packet to be transmitted is determined.

17. A method according to claim 16, wherein the second criteria is configured as FIFO.

18. A method according to claim 11, wherein an approximation to a required target distribution value is achieved by adaptive adjustment of the scheduling rules.

19. A method according to claim 18, wherein the necessary adjustment is calculated beforehand and taken into accent when defining the scheduling rules.

20. A method according to claim 18, wherein the scheduling rules are adaptively adjusted during ongoing operation of the communication network.

21. A method according to claim 20, wherein the adjustment of the scheduling rules takes place in the network node autonomously and/or by initiation from outside.

22. A method according to claim 20, wherein the adjustment is made taking into account a regulating criterion.

23. A method according to claim 22, wherein the regulating criterion comprises a comparison between the distribution actually achieved and the required target distribution value, a measurement of the frequency of processing of the different queues, a measurement of the resulting load on the ports per traffic class, a measurement of the mean length of the different queues and/or a measurement of the maximum occurring length of the different queues.

24. A method according to claim 23, wherein measurements are based on the number of packets and/or take into account the individual length of the individual packets.

25. A method according to claim 9, wherein the queues are only created as necessary and unused queues are released again.

26. A communication network, comprising:

a network node, wherein the network node is contained in at least one distribution fan that is derived from the network topology for a specific communication relation between a network node configured as a transmitting node and a network node configured as a receiving node and comprises all the network nodes and routes that can expediently be used for distributed transmission of traffic streams assigned to the communication relation in the communication network, and wherein a branch pattern is defined for the network node, onto which the distribution fan is mapped and a group of outgoing ports of the network node is determined, to which the traffic streams assigned to the distribution fan are to be distributed, whereby the routes assigned to the ports lead to at least two different adjacent network nodes, and wherein at least when at least one traffic stream is currently transmitted in a distributed manner by the network node according to the branch pattern, the network node comprises at least one queuing system for the branch pattern that comprises at least one queue; and/or at least one network node having a mechanism for entering incoming packets in a queue assigned to the respective distribution fan; and transmitting the packets via a port of a group that is determined by mapping the respective relevant distribution fan onto a network-node-specific branch pattern, whereby the routes assigned to the ports of a group each lead to at least two different adjacent network nodes.

* * * * *